(12) United States Patent  (10) Patent No.: US 8,720,478 B2
Taskar  (45) Date of Patent: May 13, 2014

(54) OPTIMIZED ACTIVATION PREVENTION MECHANISM FOR A GAS DELIVERY SYSTEM

(75) Inventor: Mark Taskar, San Mateo, CA (US)

(73) Assignee: Lam Research Corporation, Fremont, CA (US)

( * ) Notice: Subject to any disclaimer, the term of this patent is extended or adjusted under 35 U.S.C. 154(b) by 254 days.

(21) Appl. No.: 13/338,175

(22) Filed: Dec. 27, 2011

(65) Prior Publication Data

US 2012/0153197 A1    Jun. 21, 2012

Related U.S. Application Data

(62) Division of application No. 12/611,790, filed on Nov. 3, 2009, now Pat. No. 8,104,503.

(60) Provisional application No. 60/689,390, filed on Jun. 10, 2005.

(51) Int. Cl.
*F16K 35/00* (2006.01)

(52) U.S. Cl.
USPC .................. 137/383; 251/14; 251/90; 70/180

(58) Field of Classification Search
USPC .................. 251/14, 90–93; 137/383, 884; 70/175–180
See application file for complete search history.

(56) References Cited

U.S. PATENT DOCUMENTS

| 1,308,638 | A |   | 7/1919 | Metzger |  |
|---|---|---|---|---|---|
| 1,551,853 | A |   | 9/1925 | Friederick |  |
| 2,097,733 | A |   | 11/1937 | Miller |  |
| 2,305,438 | A |   | 12/1942 | Michaels |  |
| 2,320,011 | A |   | 5/1943 | Reynolds |  |
| 2,757,516 | A |   | 8/1956 | Buttolph |  |
| 2,830,784 | A | * | 4/1958 | Placette | 251/14 |
| 3,378,224 | A | * | 4/1968 | Boyle | 251/14 |
| 3,504,694 | A |   | 4/1970 | Noland |  |

(Continued)

FOREIGN PATENT DOCUMENTS

| JP | 10-165798 | 6/1998 |
|---|---|---|
| JP | 2002-208589 | 7/2002 |
| JP | 2004-028312 | 1/2004 |

OTHER PUBLICATIONS

"International Preliminary Report on Patentability", PCT Application No. PCT/US2006/022060, Mailing Date: Dec. 27, 2007.

(Continued)

*Primary Examiner* — John Bastianelli

(57) ABSTRACT

A mechanism for implementing at least one of activation and deactivation of a gas valve that is coupled to an input manifold of a processing chamber is provided. The mechanism includes a toggle arm disposed in one of a toggle activation position and a toggle deactivation position. The mechanism also includes a toggle operated switch coupled to the toggle arm and the gas valve. The toggle operated switch is disposed on top of the gas valve and the toggle arm is disposed on top of the toggle operated switch so as to minimize a footprint of an assembly that comprises the gas valve, the toggle operated switch, and the toggle arm. Thus, the process gas flow flows through the gas valve when the toggle arm is in the toggle activation position and is inhibited from flowing into the gas valve when the toggle arm is in the toggle deactivation position.

11 Claims, 7 Drawing Sheets

(56) References Cited

U.S. PATENT DOCUMENTS

| | | |
|---|---|---|
| 3,700,208 A | 10/1972 | Hanan |
| 3,737,140 A | 6/1973 | Toth |
| 3,842,854 A | 10/1974 | Wicke |
| 3,904,167 A * | 9/1975 | Touch et al. .................... 251/14 |
| 4,947,886 A | 8/1990 | Grove |
| 5,067,510 A | 11/1991 | Breaux et al. |
| 5,083,346 A | 1/1992 | Orton |
| 5,368,066 A | 11/1994 | Scaramucci |
| 5,394,715 A | 3/1995 | Guerette |
| 5,894,640 A | 4/1999 | Dewey |
| 5,992,463 A | 11/1999 | Redemann et al. |
| 6,041,813 A | 3/2000 | Koch et al. |
| 6,044,673 A | 4/2000 | Jefferson |
| 6,056,269 A | 5/2000 | Johnson et al. |
| 6,068,016 A | 5/2000 | Manofsky et al. |
| 6,102,068 A | 8/2000 | Higdon et al. |
| 6,119,494 A | 9/2000 | Whitfield |
| 6,189,570 B1 | 2/2001 | Redemann et al. |
| 6,192,938 B1 | 2/2001 | Redemann et al. |
| 6,283,155 B1 | 9/2001 | Vu |
| 6,293,310 B1 | 9/2001 | Redemann et al. |
| 6,394,138 B1 | 5/2002 | Vu et al. |
| 6,435,215 B1 | 8/2002 | Redemann et al. |
| 2006/0278835 A1 | 12/2006 | Taskar |

OTHER PUBLICATIONS

"International Search Report", PCT Application No. PCT/US06/22060, Mailing Date: Sep. 20, 2007.

"Written Opinion", PCT Application No. PCT/US06/22060, Mailing Date: Sep. 20, 2007.

"Non Final Office Action", U.S. Appl. No. 11/165,858, Mailing Date: Aug. 21, 2007.

"Final Office Action", U.S. Appl. No. 11/165,858, Mailing Date: Feb. 20, 2008.

"Non Final Office Action", U.S. Appl. No. 11/165,858, Mailing Date: Oct. 17, 2008.

"Custom Transducer Solution Helps Unit Instruments Reduce Space, Increase Reliability of New Gas Flow Control Panel", Setra Systems, Inc. May 23, 2005, http://www.setra.com/tra/art/art_sts.htm, 4 pages.

"Notification of Reasons of Refusal", Japanese Patent Application No. 2008-515857, Mailing Date: Aug. 2, 2011.

"Examination Opinions", Taiwanese Patent Application No. 95120447, Mailing Date: Dec. 16, 2011.

* cited by examiner

OPTIMIZED ACTIVATION PREVENTION MECHANISM FOR A GAS DELIVERY SYSTEM

CROSS-REFERENCE TO RELATED APPLICATIONS

This divisional application claims priority under 37 CFR 1.53(b) of and claims the benefit under 35 U.S.C. §120 to a commonly assigned patent application entitled "OPTIMIZED ACTIVATION PREVENTION MECHANISM FOR A GAS DELIVERY SYSTEM AND METHODS THEREFOR" by Mark Taskar, application Ser. No. 12/611,790 filed on Nov. 3, 2009, which claims priority from the U.S. Application entitled "Optimized Activation Prevention Assembly For A Gas Delivery System and Methods Therefore," by Mark Taskar, application Ser. No. 11/165,858 filed on Jun. 24, 2005, which claims priority from the U.S. Provisional Application No. 60/689,390 entitled "OPTIMIZED LOCKOUT/TAGOUT ASSEMBLY FOR A GAS DELIVERY SYSTEM" by inventor Mark Taskar (filed Jun. 10, 2005, all of which is incorporated herein by reference.

BACKGROUND OF THE INVENTION

The present invention relates in general to substrate manufacturing technologies and in particular to an optimized activation prevention assembly for a gas delivery system, and methods therefor.

In the processing of a substrate, e.g., a semiconductor wafer, MEMS device, or a glass panel such as one. used in flat panel display manufacturing, plasma is often employed. As part of the processing of a substrate (chemical vapor deposition, plasma enhanced chemical vapor deposition, physical vapor deposition, etch, etc.) for example, the substrate is divided into a plurality of dies, or rectangular areas, each of which will become an integrated circuit. The substrate is then processed in a series of steps in which materials are selectively removed (etching) and deposited (deposition) in order to form electrical components thereon.

In a first exemplary plasma process, a substrate is coated with a thin film of hardened emulsion (such as a photoresist mask) prior to etching. Areas of the hardened emulsion are then selectively removed, causing parts of the underlying layer to become exposed. The substrate is then placed in a plasma processing chamber on a substrate support structure comprising a mono-polar or bi-polar electrode, called a chuck. Appropriate etchant source gases (e.g., $C_4F_8$, $C_4F_6$, $CHF_3$, $CH_2F_3$, $CF_4$, $CH_3F$, $C_2F_4$, $N_2$, $O_2$, Ar, Xe, He, $H_2$, $NH_3$, $SF_6$, $BC_{13}$, $C_{12}$, etc.) are then flowed into the chamber and struck to form a plasma to etch exposed areas of the substrate.

In general, there are three types of etch processes: pure chemical etch, pure physical etch, and reactive ion etch. Pure chemical etching generally involves no physical bombardment, but rather a chemical interaction with materials on the substrate. The chemical reaction rate could be very high or very low, depending on the process. For example, fluorine-based molecules tend to chemically interact with dielectric materials on the substrate, wherein oxygen-based molecules tend to chemically interact with organic materials on the substrate, such as photoresist.

Pure ion etching is often called sputtering. Usually an inert gas, such as Argon, is ionized in a plasma and used to dislodge material from the substrate. That is, positively charged ions accelerate toward a negatively charged substrate. Pure ion etching is both isotropic (i.e., principally in one direction) and non-selective. That is, selectivity to a particular material tends to be very poor, since the direction of the ion bombardment is mostly perpendicular to the substrate surface in plasma etch process. In addition, the etch rate of the pure ion etching is commonly low, depending generally on the flux and energy of the ion bombardment.

Etching that combines both chemical and ion processes is often called reactive ion etch (RIE), or ion assist etch. Generally ions in the plasma enhance a chemical process by striking the surface of the substrate, and subsequently breaking the chemical bonds of the atoms on the surface in order to make them more susceptible to reacting with the molecules of the chemical process. Since ion etching is mainly perpendicular, while the chemical etching is both perpendicular and vertical, the perpendicular etch rate tends to be much faster than in then horizontal direction. In addition, RIE tends to have an anisotropic profile.

However, because plasma processing system operation may also be dangerous (i.e., poisonous gases, high voltages, etc.), worker safety regulations often mandate that plasma processing manufacturing equipment include activation prevention capability, such as a lockout/tagout mechanism. Generally a lockout is a device that uses positive means such as a lock, either key or combination type, to hold an energy-isolating device in a safe position, thereby preventing the energizing of machinery or equipment. For example, when properly installed, a blank flange or bolted slip blind are considered equivalent to lockout devices.

A tagout device is generally any prominent warning device, such as a tag and a means of attachment, that can be securely fastened to an energy-isolating device in accordance with an established procedure. The tag indicates that the machine or equipment to which it is attached is not to be operated until the tagout device is removed in accordance with the energy control procedure. An energy-isolating device is any mechanical device that physically prevents the transmission or release of energy. These include, but are not limited to, manually-operated electrical circuit breakers, disconnect switches, line valves, and blocks. For example, a device is generally capable of being locked out if it meets one of the following requirements: a) it is designed with a hasp to which a lock can be attached; b) it is designed with any other integral part through which a lock can be affixed; c) it has a locking mechanism built into it; or d) it can be locked without dismantling, rebuilding, or replacing the energy isolating device or permanently altering its energy control capability.

Referring now to FIG. 1, a simplified diagram of an inductively coupled plasma processing system is shown. Generally, an appropriate set of gases may be flowed from gas distribution system 122 into plasma chamber 102 having plasma chamber walls 117. These plasma processing gases may be subsequently ionized at or in a region near injector 109 to form a plasma 110 in order to process (e.g., etch or deposit) exposed areas of substrate 114, such as a semiconductor substrate or a glass pane, positioned with edge ring 115 on an electrostatic chuck 116.

A first RF generator 134 generates the plasma as well as controls the plasma density, while a second RF generator 138 generates bias RF, commonly used to control the DC bias and the ion bombardment energy. Further coupled to source RF generator 134 is matching network 136a, and to bias RF generator 138 is matching network 136b, that attempt to match the impedances of the RF power sources to that of plasma 110. Furthermore, vacuum system 113, including a valve 112 and a set of pumps 111, is commonly used to evacuate the ambient atmosphere from plasma chamber 102 in order to achieve the required pressure to sustain plasma 110 and/or to remove process byproducts.

Referring now to FIG. 2, a simplified diagram of a capacitively coupled plasma processing system is shown. Generally, capacitively coupled plasma processing systems may be configured with a single or with multiple separate RF power sources. Source RF, generated by source RF generator 234, is commonly used to generate the plasma as well as control the plasma density via capacitively coupling. Bias RF, generated by bias RF generator 238, is commonly used to control the DC bias and the ion bombardment energy. Further coupled to source RF generator 234 and bias RF generator 238 is matching network 236, which attempts to match the impedance of the RF power sources to that of plasma 220. Other forms of capacitive reactors have the RF power sources and match networks connected to the top electrode 204. In addition there are multi-anode systems such as a triode that also follow similar RF and electrode arrangements.

Generally, an appropriate set of gases is flowed through an inlet in a top electrode 204 from gas distribution system 222 into plasma chamber 202 having plasma chamber walls 217. These plasma processing gases may be subsequently ionized to form a plasma 220, in order to process (e.g., etch or deposit) exposed areas of substrate 214, such as a semiconductor substrate or a glass pane, positioned with edge ring 215 on an electrostatic chuck 216, which also serves as an electrode. Furthermore, vacuum system 213, including a valve 212 and a set of pumps 211, is commonly used to evacuate the ambient atmosphere from plasma chamber 202 in order to achieve the required pressure to sustain plasma 220.

Since it is not uncommon to have over seventeen different gases coupled to a single plasma processing system, manufactures generally configure their gas delivery systems in high density flow component configurations called "gas sticks," which may themselves be constructed in the form of a manifold assembly (i.e., stainless steel, etc.) attached to a substrate assembly. A gas flow control component generally needs only be attached to the manifold assembly on one side to complete the gas flow channels that are drilled into the manifold assembly itself.

Referring now to FIG. 3, a simplified diagram of gas stick is shown. In a common configuration, a gas cylinder (not shown) is coupled to an inlet valve 302, which allows an operator to shut off any source gas flow into the stick. In some configurations, inlet valve 302 is manually operated. In other configurations, inlet valve 302 is pneumatically operated. That is, inlet valve 302 is operated by a compressed gas, such as compressed air. In addition, although as previously stated, it is often mandated that plasma processing systems have lockout/tagout functionality, it is not generally common to integrate lockout/tagout functionality into inlet valve 302 because of space limitations within the gas distribution system.

Inlet valve 302 may be further coupled to regulator/transducer 304 that substantially maintains a constant pressure to mass flow controller 308, which may be attached to primary shutoff valve 312, which generally allows gas flow in the gas stick to be blocked. Optionally, filter 306 is placed between regulator/transducer 304 and primary shutoff valve 312 to remove any particulates that may have entered the gas stream. In addition, a purge valve 310 is generally located between primary shutoff valve 312 and mass flow controller 308. Mass flow controller 308 is generally a self-contained device (consisting of a transducer, control valve, and control and signal-processing electronics) commonly used to measure and regulate the mass flow of gas to the plasma processing system.

Further coupled to mass flow controller 308, and generally not included in the gas stick itself, is a mixing manifold 314 that generally combines the gas flows from each of the appropriate gas sticks and channels the mixed gases into plasma chamber 318 through injector 316.

However, the density of flow components to each other in a gas distribution system also tends to make individual gas stick activation prevention problematic, particularly at a gas stick inlet valve. In a typical configuration, all the plasma gases must generally be turned off and then vented, should an employee wish to physically access the gas distribution system, for example, as part of the tool assembly process, or in order to integrate the plasma processing system with a customer fabrication facility. This venting process may be further aggravated since the plasma gas shutoff for the gas feed into the inlet valve (prior to entering the gas stick) may not be physically located at the plasma processing system. Hence, an employee may either need to waste time traveling to the plasma gas shutoff location, or the employee may need to coordinate with another employee do the same. It would thus be advantageous to quickly and safely turn off a single gas stick in order to debug a problem or test a gas flow.

In view of the foregoing, there are desired an optimized activation prevention assembly for a gas delivery system and methods therefor.

SUMMARY OF THE INVENTION

The invention relates, in an embodiment, to an optimized activation prevention assembly for a gas delivery system. The apparatus includes a pneumatically operated valve assembly. The apparatus also includes a toggle switch mechanically attached to the pneumatically operated valve assembly, the toggle switch includes a toggle arm, the toggle arm being positioned in one of an activation zone and a deactivation zone, wherein when the toggle arm is positioned in the activation zone, the pneumatically operated valve is activated, and wherein when the toggle arm is positioned in the deactivation zone, the pneumatically operated valve is deactivated. The apparatus further includes an activation prevention mechanism attached to the toggle switch, wherein when the activation prevention mechanism being configured for preventing the toggle arm from being repositioned from the deactivation zone to the activation zone without at least bypassing a lockout function of the optimized activation prevention mechanism.

The invention relates, in an embodiment, to a method of preventing the activation of a pneumatically operated valve assembly in a gas delivery system. The method includes providing the pneumatically operated valve assembly. The method also includes attaching a toggle switch to the pneumatically operated valve assembly, the toggle switch including a toggle arm, the toggle arm being positioned in one of an activation zone and a deactivation zone, the toggle switch further configured such that when the toggle switch is positioned in the activation zone, the pneumatically operated valve is activated, and wherein when the toggle arm is positioned in the deactivation zone, the pneumatically operated valve is deactivated. The method further includes attaching an activation prevention mechanism to the toggle switch, the activation prevention mechanism being configured for preventing the toggle arm from being repositioned from the deactivation zone to the activation zone without at least bypassing a lockout function of the optimized activation prevention mechanism.

The invention relates, in an embodiment, to an apparatus for preventing the activation of a pneumatically operated valve assembly in a gas delivery system. The apparatus includes a means for providing the pneumatically operated valve assembly. The apparatus also includes a means for attaching a toggle switch to the pneumatically operated valve assembly, the toggle switch including a toggle arm, the toggle arm being positioned in one of an activation zone and a deactivation zone, the toggle switch further configured such that when the toggle switch is positioned in the activation zone, the pneumatically operated valve is activated, and wherein when the toggle arm is positioned in the deactivation zone, the pneumatically operated valve is deactivated. The apparatus further includes a means for attaching an activation prevention mechanism to the toggle switch, the activation prevention mechanism being configured for preventing the toggle arm from being repositioned from the deactivation zone to the activation zone without at least bypassing a lockout function of the optimized activation prevention mechanism.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
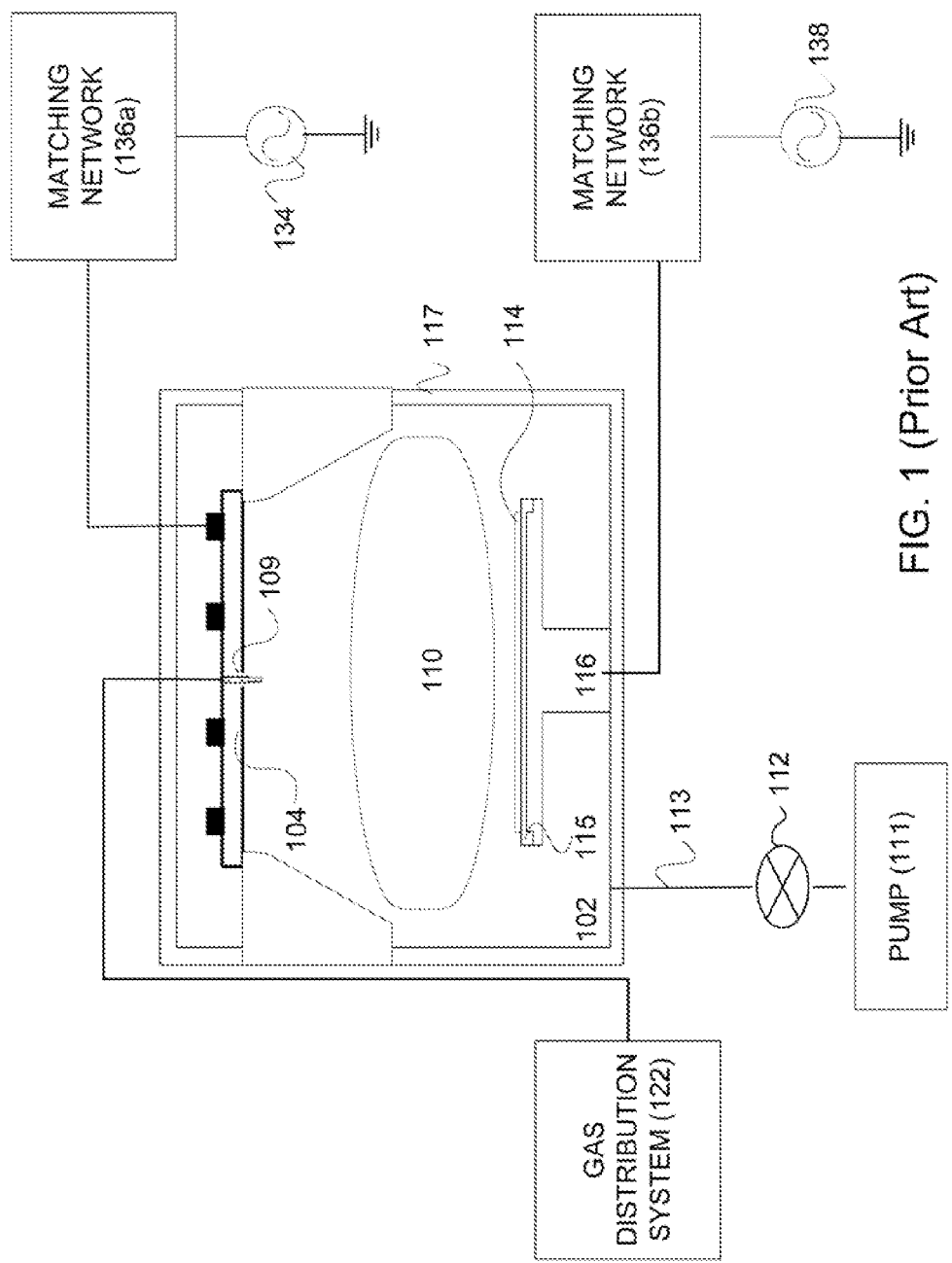
FIG. 1 illustrates a simplified diagram of an inductively coupled plasma processing system.
Figure 2:
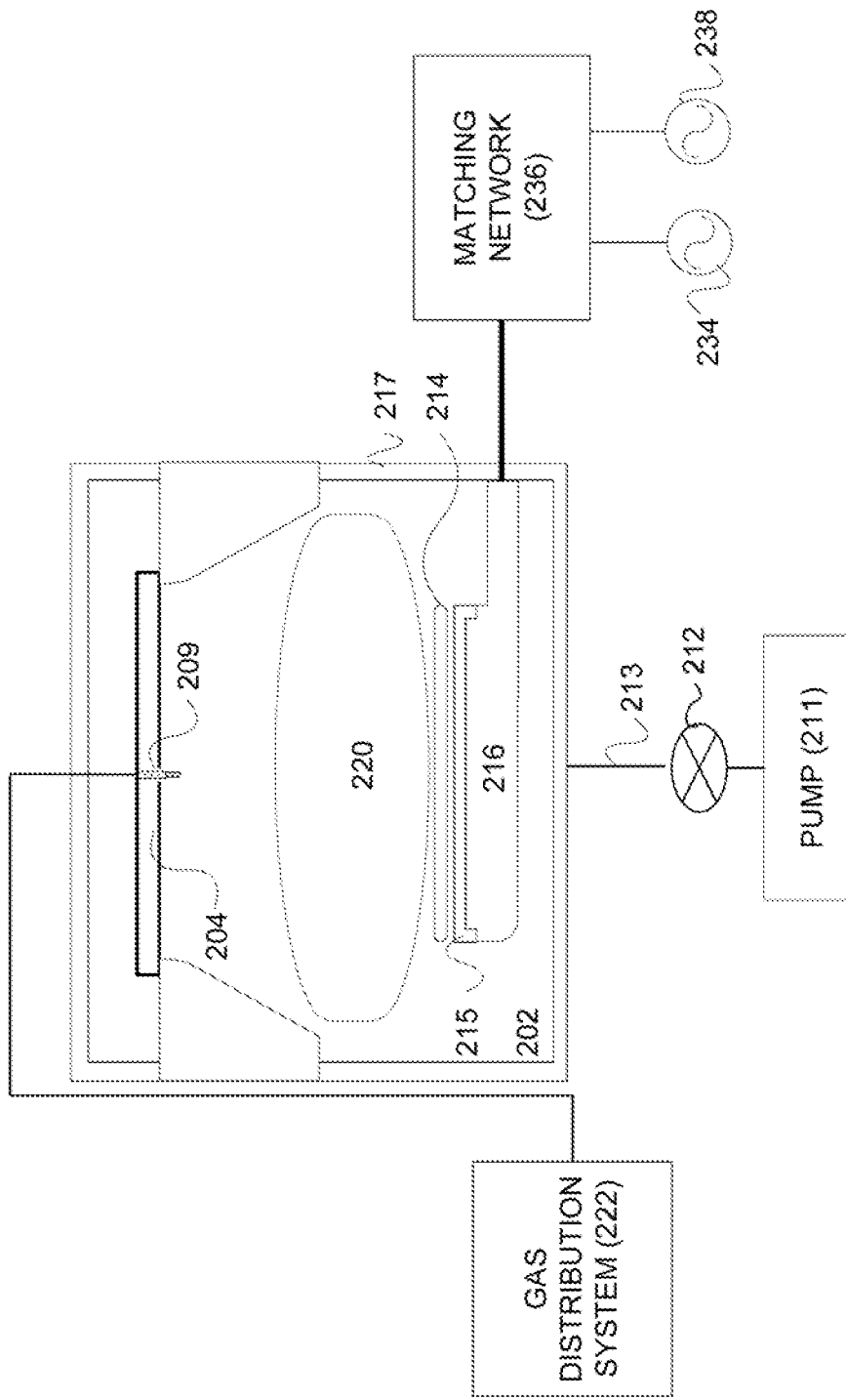
FIG. 2 illustrates a simplified diagram of a capacitively coupled plasma processing system.
Figure 3:
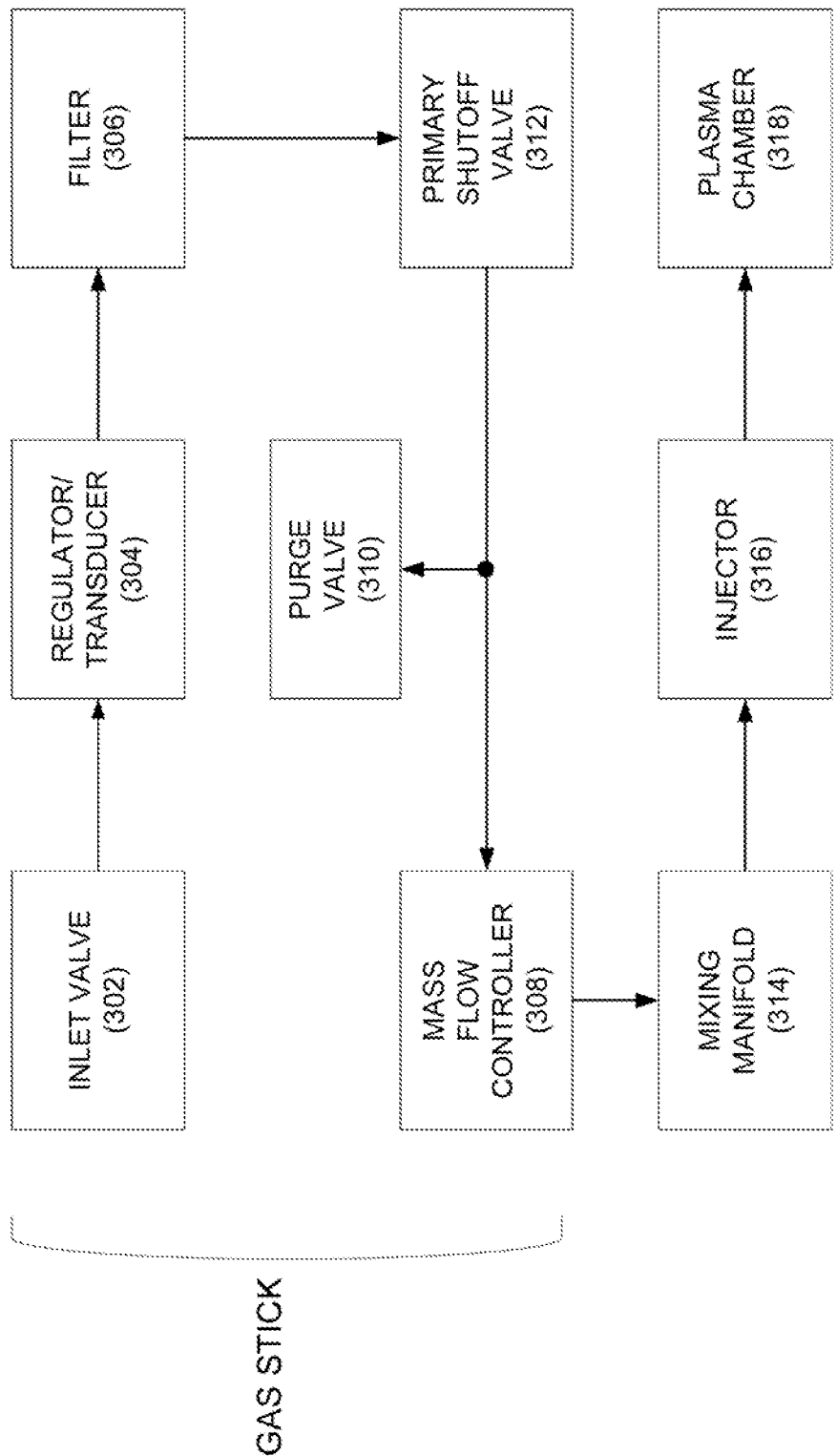
FIG. 3 illustrates a simplified diagram of gas stick.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In general, as previously described, worker safety regulations often mandate that plasma processing manufacturing equipment include activation prevention capability, such as a lockout/tagout mechanism. Generally a lockout is a device that uses positive means such as a lock, either key or combination type, to hold an energy-isolating device in a safe position. A tagout device is generally any prominent warning device, such as a tag and a means of attachment that can be securely fastened to energy-isolating device in accordance with an established procedure.

However, gas stick density tends to make individual gas stick activation prevention problematic, particularly at a gas stick inlet valve. In a non-obvious way, unlike commonly used gas stick lockout/tagout techniques of directly blocking plasma gas flow with a manual valve (energy-isolating device), the current invention indirectly blocks plasma gas flow by manually deactivating a pneumatically operated valve. That is, manually blocking compressed gas flow to a pneumatically operated valve causes the valve to become deactivated (closed), which in turn effectively stops plasma gas flow within the gas stick. Thus, the integration of a lockout/tagout mechanism with a pneumatically operated valve may allow gas stick component density to be maintained, while substantially improving employee safety by allowing each gas stick to be individually and quickly locked and/or tagged.

In an embodiment, an optimized activation prevention assembly is advantageously employed on a gas stick inlet valve. In an embodiment, the optimized activation prevention assembly includes a lockout mechanism. In an embodiment, the optimized activation prevention assembly includes a tagout mechanism. A lockout mechanism generally allows a lock to be attached in order to place a device in a safe position, while a tagout mechanism may notify an employee as to the presence of the lock.

Although usually mandated by regulation, this invention does not require that both the lock and the tag be simultaneously added to the optimized activation prevention assembly. In an embodiment, the optimized activation prevention assembly is integrated into a manual gas stick inlet valve. In an embodiment, the optimized activation prevention assembly is integrated into a pneumatically operated valve, such that engaging the lockout/tagout mechanism of the optimized activation prevention assembly blocks compressed gas from activating the pneumatically operated valve. In an embodiment, the pneumatically operated valve is an IGS (integrated gas system) valve.

Figure 4:
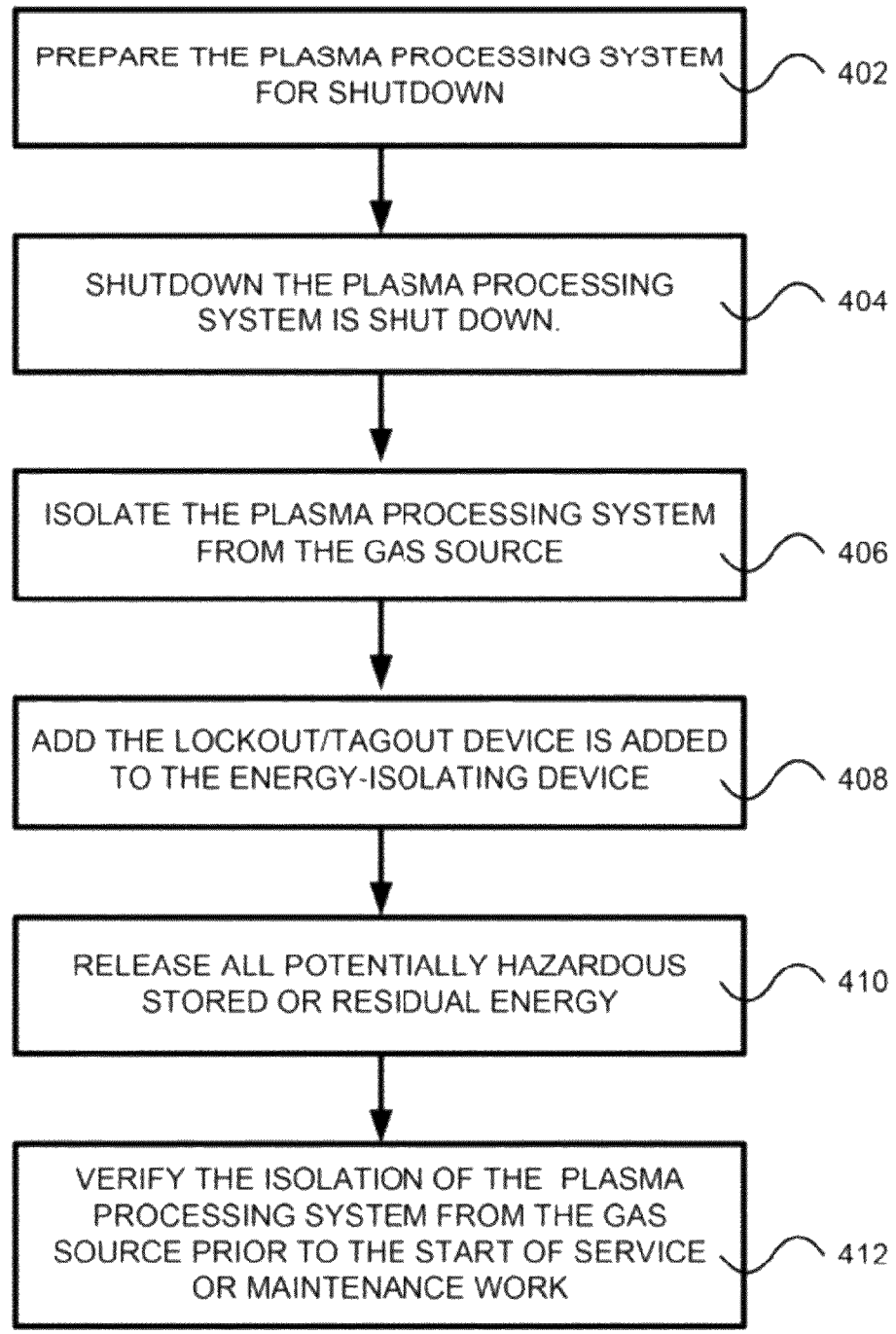
FIG. 4 illustrates a simplified lockout/tagout procedure, according to one embodiment of the invention.

Referring now to FIG. 4, a simplified lockout/tagout procedure is shown, according to one embodiment of the invention. At step 402, the plasma processing system is prepared for shutdown. Next, at step 404, the plasma processing system is actually shut down. Next, at step 406, the plasma processing system is isolated from the gas source (e.g., by shutting the inlet valve, etc.). Next, at step 408, the lockout/tagout device is added to the energy-isolating device (e.g., inlet valve, etc.). Next, at step 410 all potentially hazardous stored or residual energy is safely released (e.g., by venting any gas in the plasma stick, etc.). Finally at step 412, the isolation of the plasma processing system from the gas source is verified prior to the start of service or maintenance work.

Figure 5:
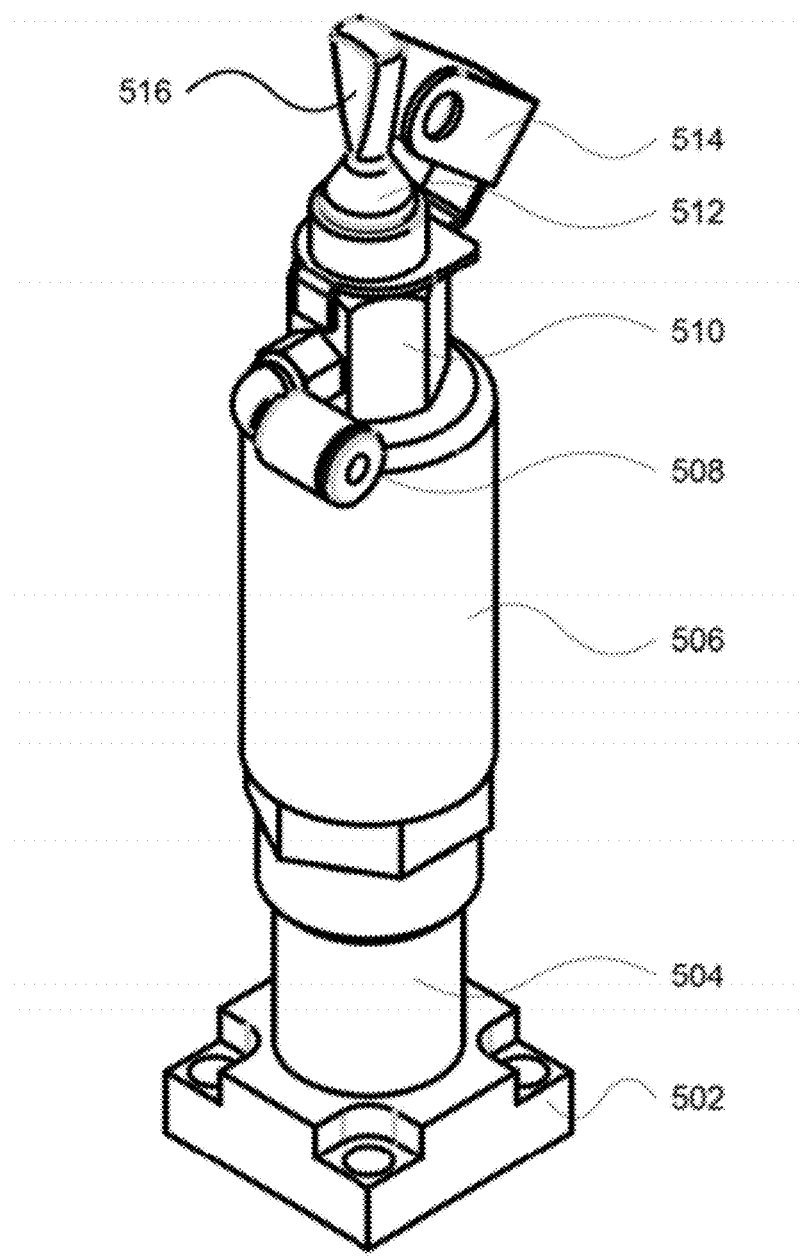
FIG. 5 illustrates a simplified diagram of an optimized activation prevention assembly integrated into a pneumatically operated valve, according to one embodiment of the invention.

Referring now to FIG. 5, a simplified diagram of a optimized activation prevention assembly integrated into a pneumatically operated valve is shown, according to an embodiment of the invention. In an embodiment, the valve is an integrated surface mount valve. In general, an integrated surface mount component is a gas control component (e.g., valve, filter, etc.) that is connected to other gas control components through channels on a substrate assembly, upon which the gas control components are mounted. This is in contrast to gas control components that are generally attached through bulky conduits with VCR attachments (vacuum coupled ring).

In an embodiment, the valve is a gas stick inlet valve. In an embodiment, the valve is an IGS valve. Mounted on a substrate assembly (not shown) is typically a manifold assembly 502 to which pneumatically operated valve 506 is attached through an adapter 504. In an embodiment, adapter 504 is threaded. In a typical configuration, a pressure coupling 508 allows a compressed gas line (not shown) to be attached to pneumatically operated valve 506 through adapter-fitting 510. That is, as compressed air enters pneumatically operated valve 506 through adapter-fitting 510, a valve mechanism is engaged and gas is allowed to flow in the gas stick.

In an embodiment, adapter 510 is threaded. Further attached to adapter 510 is a manual shutoff switch 512 and lockout/tagout mechanism 514. When manual shutoff switch 512 is engaged by toggle arm 516, compressed gas is blocked causing pneumatically operated valve 506 to be deactivated, and stopping plasma gas flow within the gas stick. In addition, the manual shutoff switch 512 may also contain an exhaust port allowing any compressed air that was in pneumatically operated valve 506, prior to the engagement of manual shutoff switch 512, to be vented. That is, the pressure within pneumatically operated valve 506 may be made substantially the same as the pressure outside pneumatically operated valve 506. In addition, a lock and/or tag may thus be added to lockout/tagout mechanism 514, in order to substantially insure the safe maintenance of the plasma processing system. In an embodiment, the optimized activation prevention assembly is configured to minimize early or accidental removal. That is, pneumatically operated valve 506 may not be activated without first removing the lock and/or tag, or else substantially damaging the optimized activation prevention assembly. In an embodiment, the lock is non-reusable. In an embodiment, the lock is attachable by hand. In an embodiment, the lock is self-locking. In an embodiment, the lock is non-releasable. In an embodiment, the tag is a one-piece nylon cable tie. In an embodiment, the tag states one of the following: "DO NOT START," "DO NOT OPEN," "DO NOT CLOSE," "DO NOT ENERGIZE," and "DO NOT OPERATE."

Figure 6:
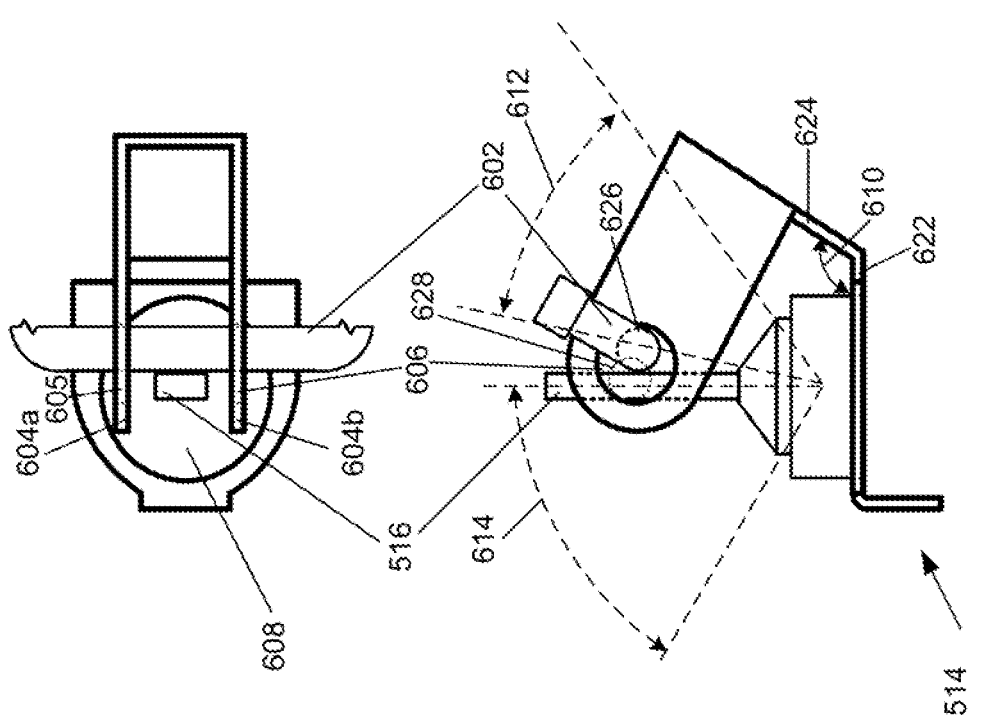
FIG. 6 illustrates a simplified set of diagrams of an optimized activation prevention assembly, according to one embodiment of the invention.

Referring now to FIG. 6, a simplified set of top view and side view of lockout/tagout mechanism 514 of FIG. 5 is shown, according to an embodiment of the invention. In general, a toggle arm, (e.g., toggle arm 516), may be inserted through cavity 608 wherein cavity 608 is disposed in a first portion 622 of lockout/tagout mechanism 514), such that toggle arm 516 is sandwiched between panels 604a-b (wherein panels are coupled with a second portion 624 of lockout/tagout mechanism 514). Second portion 624 is at a constant angle 610 to first portion 622, angle 610 being between greater than 90 degrees and less than 180 degrees. Lockout/tagout mechanism 514 further includes a deactivation zone 614 and an activation zone 612, such that when toggle arm 516 is positioned in deactivation zone 614 (deactivating pneumatically operated valve 506 as shown in FIG. 5), and a lock is positioned through channels 605-606 and positioned a first position 626 determining a limit of deactivation zone 614 toggle arm 516 cannot be repositioned to activation zone 612 without bypassing lockout/tagout mechanism 514 (e.g., tearing panels 604a-b, removing lock 602, bending lockout/tagout mechanism 514, etc.). A limit of activation zone 612 may be determined by a position 628 of lock 602.

Figure 7:
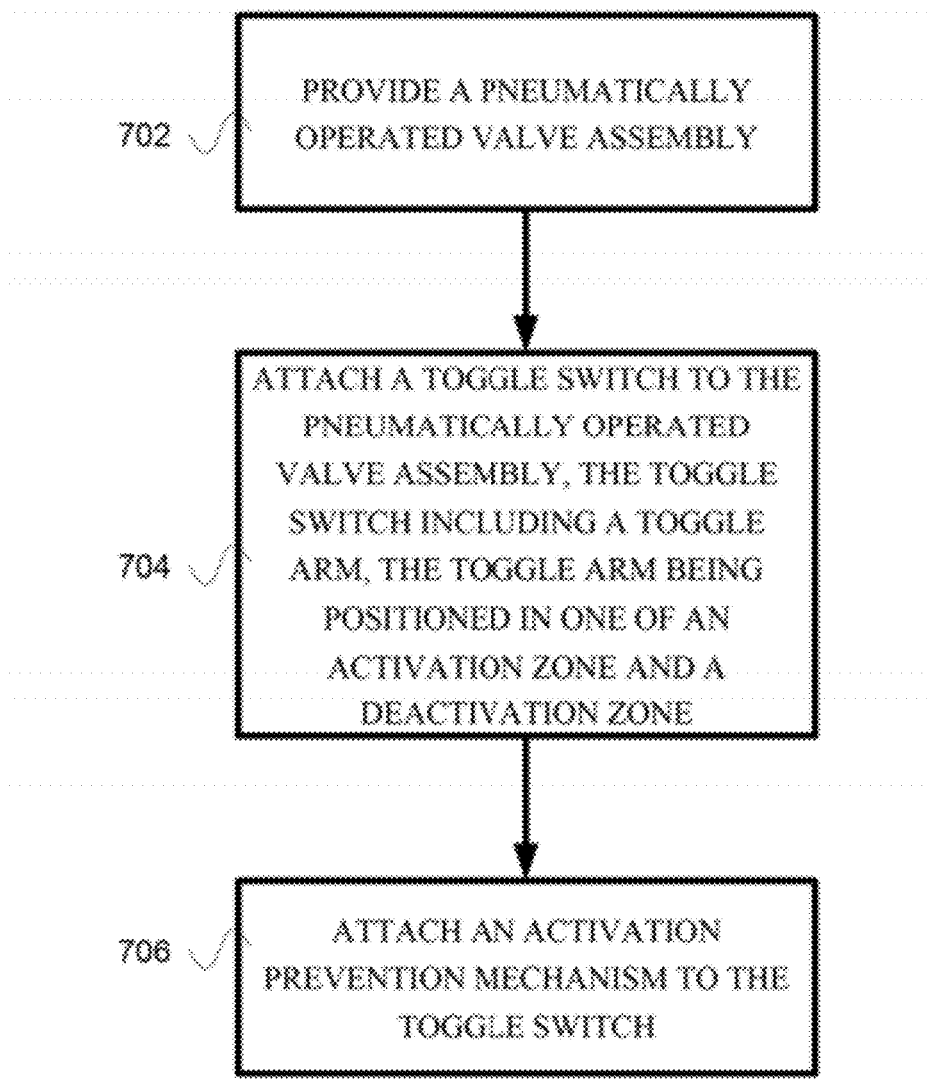
FIG. 7 illustrates a simplified method of preventing the activation of a pneumatically operated valve assembly in a gas delivery system, according to one embodiment of the invention.

Referring now to FIG. 7, a simplified method of preventing the activation of a pneumatically operated valve assembly in a gas delivery system. Initially, at step 702, a pneumatically operated valve assembly is provided. Next, at step 704, a toggle switch is attached to the pneumatically operated valve assembly, the toggle switch including a toggle arm, the toggle arm being positioned in one of an activation zone and a deactivation zone. Finally, at step 706 an activation prevention mechanism is attached to the toggle switch.

While this invention has been described in terms of several preferred embodiments, there are alterations, permutations, and equivalents which fall within the scope of this invention. For example, although the present invention has been described in connection with Lam Research plasma processing systems (e.g., Exelan™, Exelan™ HP, Exelan™ HPT, 2300™, Versys™ Star, etc.), other plasma processing systems may be used. This invention may also be used with substrates of various diameters (e.g., 200 mm, 300 mm, etc.). In addition, any type of pneumatically operated valve may be used. It should also be noted that there are many alternative ways of implementing the methods of the present invention.

Advantages of the invention include the avoidance of cost related to non-optimized gas delivery systems, in which all the plasma gases must generally be turned off and then vented, should an employee wish to physically access the gas distribution system for maintenance, assembly, or integration. Additional advantages include allowing gas stick component density to be maintained, while substantially improving employee safety by allowing each gas stick to be individually and quickly locked and/or tagged.

Having disclosed exemplary embodiments and the best mode, modifications and variations may be made to the disclosed embodiments while remaining within the subject and spirit of the invention as defined by the following claims.

What is claimed is:

1. A mechanism for implementing at least one of activation and deactivation of a gas valve, said gas valve being coupled to an input manifold of a processing chamber, said mechanism comprising:

a toggle arm configured to be disposed in one of a toggle activation position and a toggle deactivation position; and a toggle operated switch coupled to said toggle arm and said gas valve, said toggle operated switch being disposed on top of said gas valve, said toggle arm being disposed on top of said toggle operated switch so as to minimize a footprint of an assembly that comprises said gas valve, said toggle operated switch, and said toggle arm, wherein process gas flow flows through said gas valve when said toggle arm is in said toggle activation position and said process gas flow is inhibited from flowing into said gas valve when said toggle arm is in said toggle deactivation position, a pressure coupler for receiving compressed gas, and an adapter fitting having a fitting top, a fitting bottom opposite said fitting top, and a fitting side orthogonal to both said fitting top and said fitting bottom, said fitting side being coupled to said pressure coupling, said fitting top being coupled to said toggle operated switch, and said fitting bottom being coupled to said gas valve, wherein when said toggle arm is disposed in the toggle activation position, compressed gas flows through said adapter fitting to activate said gas valve to enable process gas flow into said input manifold, and and wherein when said toggle arm is disposed in said toggle deactivation position, said toggle operated switch inhibits said compressed gas from reaching said gas valve through said adapter fitting, thereby enabling said toggle operated switch to indirectly inhibit said process gas from flowing into said input manifold.

2. The mechanism of claim 1 further comprising a lock-out mechanism configured for preventing said toggle arm from being moved from said toggle deactivation position to said toggle activation position when a lock is employed with said lock-out mechanism.

3. The mechanism of claim 2 wherein said lockout mechanism comprises:
   a first panel having a cavity through which said toggle arm is disposed,
   a second panel coupled to said first panel, said second panel having therein a lock hole configured to receive a lock, wherein when said lock is disposed in said lock hole, said toggle arm is inhibited from moving from said toggle deactivation position to said toggle activation position.

4. The mechanism of claim 3 wherein said first panel is disposed between said toggle operated switch and said toggle arm.

5. The mechanism of claim 3 wherein said gas valve is employed in a plasma processing system.

6. The mechanism of claim 3 wherein said gas valve is a gas stick inlet valve for a plasma processing system.

7. The mechanism of claim 3 wherein said gas valve is an integrated surface mount valve.

8. The mechanism of claim 3 further comprising a tag-out arrangement for signaling a deactivation state of said gas valve.

9. The mechanism of claim 3 wherein said assembly that includes said gas valve, said toggle operated switch, and said toggle arm is mounted in a perpendicular direction with respect to said input manifold.

10. The mechanism of claim 1 wherein said toggle operated switch is configured to vent said compressed gas from within said gas valve when said toggle arm is moved from said toggle activation position to said toggle deactivation position.

11. The mechanism of claim 1 wherein said toggle operated switch includes an exhaust port, wherein said exhaust port enables said compressed gas from within said gas valve to be vented when said toggle arm is moved from said toggle activation position to said toggle deactivation position.

* * * * *

UNITED STATES PATENT AND TRADEMARK OFFICE
CERTIFICATE OF CORRECTION

| | |
|---|---|
| PATENT NO. | : 8,720,478 B2 |
| APPLICATION NO. | : 13/338175 |
| DATED | : May 13, 2014 |
| INVENTOR(S) | : Mark Taskar |

It is certified that error appears in the above-identified patent and that said Letters Patent is hereby corrected as shown below:

In the Specification:

Column 1, Background Of The Invention, Line 50:   Delete "BC13, C12" and Insert --BCl3, Cl2--

Column 7, Detailed Description Of The Preferred Embodiments, Line 10:   Delete "adapter" and insert --adapter-fitting--

Column 7, Detailed Description Of The Preferred Embodiments, Line 11:   Delete "adapter" and insert --adapter-fitting--

Column 7, Detailed Description Of The Preferred Embodiments, Line 55:   After "614" insert --,--

In the Claims:

Column 8, Claim 1, Line 60:   In Claim 1, before "wherein", delete "and"

Column 9, Claim 3, Line 7:   In Claim 3, after "disposed", insert --and--

Signed and Sealed this
Fourteenth Day of October, 2014

Michelle K. Lee
*Deputy Director of the United States Patent and Trademark Office*